United States Patent
Wilson et al.

(10) Patent No.: US 7,848,825 B2
(45) Date of Patent: Dec. 7, 2010

(54) MASTER/SLAVE MODE FOR SENSOR PROCESSING DEVICES

(75) Inventors: Thomas James Wilson, Pleasanton, CA (US); Minh-Dieu Thi Vu, Cupertino, CA (US); Yutaka Hori, Cupertino, CA (US)

(73) Assignee: Apple Inc., Cupertino, CA (US)

(*) Notice: Subject to any disclaimer, the term of this patent is extended or adjusted under 35 U.S.C. 154(b) by 263 days.

(21) Appl. No.: 11/650,042

(22) Filed: Jan. 3, 2007

(65) Prior Publication Data
US 2008/0158177 A1  Jul. 3, 2008

(51) Int. Cl.
G05B 19/18 (2006.01)

(52) U.S. Cl. .................... 700/3; 700/20; 345/173

(58) Field of Classification Search .............. 700/1, 700/2, 3; 345/173, 1.1, 1.2; 715/864; 340/407.1
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,335,725 B1 | 1/2002 | Koh et al. |
| 6,518,957 B1 | 2/2003 | Lehtinen et al. |
| 6,570,557 B1 | 5/2003 | Westerman et al. |
| 6,677,932 B1 | 1/2004 | Westerman |
| 6,690,387 B2 | 2/2004 | Zimmerman et al. |
| 6,888,536 B2 | 5/2005 | Westerman et al. |
| 7,015,894 B2 | 3/2006 | Morohoshi |

(Continued)

FOREIGN PATENT DOCUMENTS

JP    2000-163031 A    6/2000

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner*—Paul L Rodriguez
*Assistant Examiner*—Nathan Laughlin
(74) *Attorney, Agent, or Firm*—Morrison & Foerster LLP

(57) ABSTRACT

A computer system having two or more controllers operating in a Master/Slave configuration is disclosed. In one embodiment, the computer system includes: a sensor panel having a first portion for generating a first set of sense signals indicative of a touch or no-touch condition on the first portion, and a second portion for generating a second set of sense signals indicative of a touch or no-touch condition on the second portion; a first device for receiving and processing the first set of output signals from the first portion of the panel; and a second device for receiving and processing the second set of output signals from the second portion of the panel, wherein the first and second devices operate cooperatively in a Master/Slave configuration.

31 Claims, 7 Drawing Sheets

U.S. PATENT DOCUMENTS

| | | | |
|---|---|---|---|
| 7,184,064 | B2 | 2/2007 | Zimmerman et al. |
| RE40,153 | E | 3/2008 | Westerman et al. |
| 7,339,580 | B2 | 3/2008 | Westerman et al. |
| RE40,993 | E | 11/2009 | Westerman |
| 2004/0232964 | A1* | 11/2004 | Wiktor et al. ............... 327/172 |
| 2005/0146511 | A1* | 7/2005 | Hill et al. .................... 345/173 |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0073888 | A1* | 4/2006 | Nguyen et al. ............... 463/27 |
| 2006/0085757 | A1 | 4/2006 | Andre et al. |
| 2006/0097991 | A1 | 5/2006 | Hotelling et al. |
| 2006/0197753 | A1 | 9/2006 | Hotelling |
| 2008/0158172 | A1 | 7/2008 | Hotelling et al. |
| 2008/0158175 | A1 | 7/2008 | Hotelling et al. |
| 2008/0162997 | A1 | 7/2008 | Vu et al. |
| 2008/0238879 | A1* | 10/2008 | Jaeger et al. ................ 345/173 |

FOREIGN PATENT DOCUMENTS

| | | | |
|---|---|---|---|
| JP | 2002-342033 | A | 11/2002 |
| WO | WO2005114369 | A2 * | 12/2005 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

United States Patent US 7,848,825 B2

MASTER/SLAVE MODE FOR SENSOR PROCESSING DEVICES

FIELD OF THE INVENTION

This disclosure relates to utilizing two or more processing devices in a Master/Slave configuration, and more particularly, to a method and system of using two or more processing devices in a Master/Slave configuration to process the output signals generated by two or more portions (e.g., halves) of a touch surface panel.

BACKGROUND OF THE INVENTION

Touch pads and touch screens (collectively "touch surfaces") are becoming increasingly popular as input devices for performing operations in a computer system because of their ease and versatility of operation as well as to their declining price. Touch surfaces allow a user to make selections and move a cursor by simply touching the surface of a pad or the display screen, with a finger, stylus, or the like. In general, the touch surface recognizes the touch and position of the touch and the computer system interprets the touch and thereafter performs an action based on the touch.

Touch pads are well-known and ubiquitous today in laptop computers, for example, as a means for moving a cursor on a display screen. Such touch pads typically include a touch-sensitive opaque panel which senses when an object (e.g., finger) is touching portions of the panel surface. Touch screens are also well known in the art. Various types of touch screens are described in applicant's co-pending patent application Ser. No. 10/840,862, entitled "Multipoint Touchscreen", filed May 6, 2004, which is hereby incorporated by reference in its entirety. As noted therein, touch screens typically include a touch-sensitive panel, a controller and a software driver. The touch-sensitive panel is generally a clear panel with a touch sensitive surface. The touch-sensitive panel is positioned in front of a display screen so that the touch sensitive surface covers the viewable area of the display screen. The touch-sensitive panel registers touch events and sends these signals to the controller. The controller processes these signals and sends the data to the computer system. The software driver translates the touch events into computer events. There are several types of touch screen technologies including resistive, capacitive, infrared, surface acoustic wave, electromagnetic, near field imaging, etc. Each of these devices has advantages and disadvantages that are taken into account when designing or configuring a touch screen.

In conventional touch surface devices, sensing circuitry measures the dynamic output signals generated by the touch-sensitive panels. The output signal is a dynamic signal in that it changes between two or more states (e.g., a "touch" or "no touch" condition). In conventional sensing circuitry, there is typically a plurality of operational amplifiers that amplify the output signals. Additionally, the sensing circuitry typically include signal compensation and conditioning (e.g., mixing to remove noise) circuitry to improve the accuracy and dynamic range of the output signal. A more detailed discussion of such sensing circuitry is provided in co-pending and commonly owned application No. 11/650,043, entitled "Front-End Charge Compensation Method and System," concurrently filed herewith, the entirety of which is incorporated by reference herein.

Additionally, in touch surface devices where the output signal is a charge waveform (e.g., an output signal from a capacitive touch surface), a relatively large feedback capacitor is typically connected between the output of each amplifier and the inverting input of each amplifier in order to accommodate relatively large charge amplitudes at the inverting input of the amplifier. The charge amplitudes should be sufficiently large to provide a sufficiently high signal-to-noise (S/N) ratio. The large feedback capacitors, however, consume a significant amount of integrated circuit (IC) chip "real estate" and hence, add significant costs and size requirements to the IC chips.

Thus, the sensing circuitry can impose significant cost and size requirements on the design of an application specific integrated circuit (ASIC), especially if the sensing circuitry must sense a large number of output signals simultaneously in parallel. For large touch surface devices having a large touch-sensitive panel that can generate a large number of output signals simultaneously (e.g., those having a large number of column sense electrodes), the ASIC can become quite large and expensive.

Additionally, it is desirable to provide an ASIC that can process the outputs of smaller touch surface devices, without under-utilizing the capacity of the ASIC. However, manufacturing multiple different ASICs for different sizes of touch surface devices also results in cost disadvantages from a manufacturing standpoint.

Therefore, there is a need for a method and system for receiving and processing the output signals for large touch surface devices without imposing unduly large cost and size requirements for the processing circuitry. Additionally, the processing circuitry should be able to accommodate smaller touch surface devices without under-utilizing its processing capacity, which would be inefficient from a cost and design perspective.

SUMMARY OF THE INVENTION

The invention addresses the above and other needs by providing a new method and system wherein two or more output processing devices (e.g., controller ASIC's) can be utilized in a Master/Slave configuration to receive and process the output signals from two or more respective portions of a touch surface device. Depending on the size of the touch surface panel, the number of processing devices may be increased or decreased, as necessary, in a modular fashion to accommodate all the output signals that must be processed simultaneously or concurrently. It will be understood that if the size of the panel is small enough, only a single processing device may be utilized. This modularity adds flexibility to system designs and significantly reduces costs by allowing a single, modular processing device to accommodate various panel sizes. Additionally, by operating two or more processing devices in a Master/Slave configuration, system power consumption and processing requirements are significantly reduced.

In one embodiment, a touch surface device includes two or more devices for processing output signals from two or more respective portions of a touch surface panel. The two or more devices operate synchronously in a Master/Slave configuration, wherein one device serves as the Master and the other device(s) serve as the Slave. Each Slave device processes the output signals from its respective panel portion and thereafter provides the resulting data to the Master device for storage and further processing.

In a further embodiment, a computer system utilizing a touch surface input device includes two devices operating in a Master/Slave configuration, wherein the Slave device receives all timing and clock signals from the Master device. A clock generator and microprocessor residing in the slave device is disabled. A Master clock generation module provides a clock signal for both the Master and Slave devices and a Master microprocessor functions as the microprocessor for both the Master and Slave devices.

In one embodiment, the Master and Slave devices are each configured as application specific integrated circuits (ASIC's), each having an analog channel block, channel scan logic block, auxiliary serial peripheral interface (ASPI) that controls data flow between the Master and Slave, and register blocks, which hold programming state data for both Master and Slave devices. The ASPI's of both the Master and Slave devices communicate commands and data in accordance with a predetermined communication protocol so as to minimize or eliminate intervention by their respective internal microprocessors during such communications.

In a further embodiment, processes are performed by the Master and Slave devices in a pipeline fashion. For example, during a first time period, row 1 of a touch surface panel is scanned. During a second time period, row 1 scan results are stored in their respective Master and Slave memories in parallel with scanning of row 2. During a third time period, row 1 results are shifted from the Slave to the Master in parallel with storing of row 2 results in parallel with scanning row 3, and so. In one embodiment, the Master device controls which row is being scanned, and the Slave device takes row address data from the Master device by using the same pins that Master uses as output pins to provide row address signals to amplification and decoding circuitry. It will be understood that "parallel" or "pipelined" operations described above and further below do not necessarily begin and end at precisely the same moment in time but encompass operations or portions of operations that can be performed in a time-overlapping manner. In other words, one operation does not necessarily have to wait for completion of another operation before it can begin.

In a further embodiment, upon power up, Master device program registers are programmed by a microprocessor in the Master device. The Master device sends the same program data in serial packets to the Slave device to program registers in the Slave device. The Slave receives a clock signal from external output pins of the Master device, and the clock is also used as a "pixel" clock to drive the channel scan logic and analog channel block in both the Master and Slave Devices.

In one embodiment, a first processing device (e.g., ASIC1) receives a first set of output signals from a first portion of a touch surface panel while a second processing device (e.g., ASIC2) receives a second set of output signals from a second portion of the touch surface panel. The first processing device processes the first set of output signals to generate a first set of results while the second processing device processes the second set of output signals to generate a second set of results. The first set of results are stored in a first memory device located in the first processing device and the second set of results are shifted to the first processing device to be stored in the first memory.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention. Furthermore, although embodiments of the present invention are described herein in terms of devices and applications compatible with computer systems and devices manufactured by Apple Computer, Inc. of Cupertino, Calif., such embodiments are illustrative only and should not be considered limiting in any respect.

Figure 1:
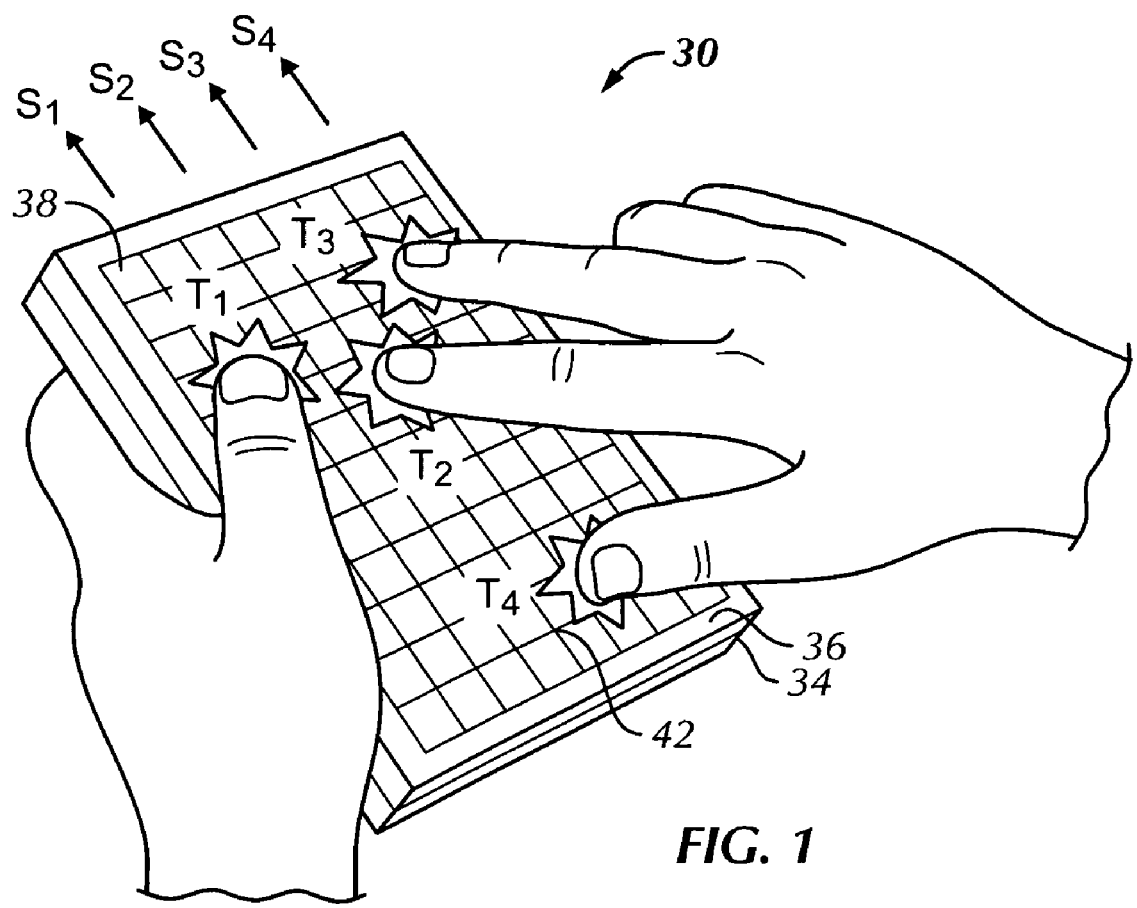
FIG. 1 illustrates an exemplary touch surface device.

FIG. 1 illustrates a touch screen display arrangement 30, which includes a display 34 and a transparent touch screen 36 positioned in front of display 34. Display 34 may be configured to display a graphical user interface (GUI) including perhaps a pointer or cursor as well as other information to the user. Transparent touch screen 36 is an input device that is sensitive to a user's touch, allowing a user to interact with the graphical user interface on display 34. In general, touch screen 36 recognizes touch events on surface 38 of touch screen 36 and thereafter outputs this information to a host device. The host device may, for example, correspond to a computer such as a desktop, laptop, handheld or tablet computer. The host device interprets the touch event and thereafter performs an action based on the touch event.

In one embodiment, touch screen 36 is configured to recognize multiple touch events that occur simultaneously at different locations on touch sensitive surface 38. That is, touch screen 36 allows for multiple contact points T1-T4 to be tracked simultaneously. Touch screen 36 generates separate tracking signals S1-S4 for each touch point T1-T4 that occurs on the surface of touch screen 36 at the same time. In one embodiment, the number of recognizable touches may be about fifteen which allows for a user's ten fingers and two palms to be tracked along with three other contacts. The multiple touch events can be used separately or together to perform singular or multiple actions in the host device. Numerous examples of multiple touch events used to control a host device are disclosed in U.S. Pat. Nos. 6,323,846; 6,888, 536; 6,677,932; 6,570,557, and co-pending U.S. patent application Ser. Nos. 11/015,434; 10/903,964; 11/048,264; 11/038,590; 11/228,758; 11/228,700; 11/228,737; 11/367, 749, each of which is hereby incorporated by reference in its entirety.

Figure 2:
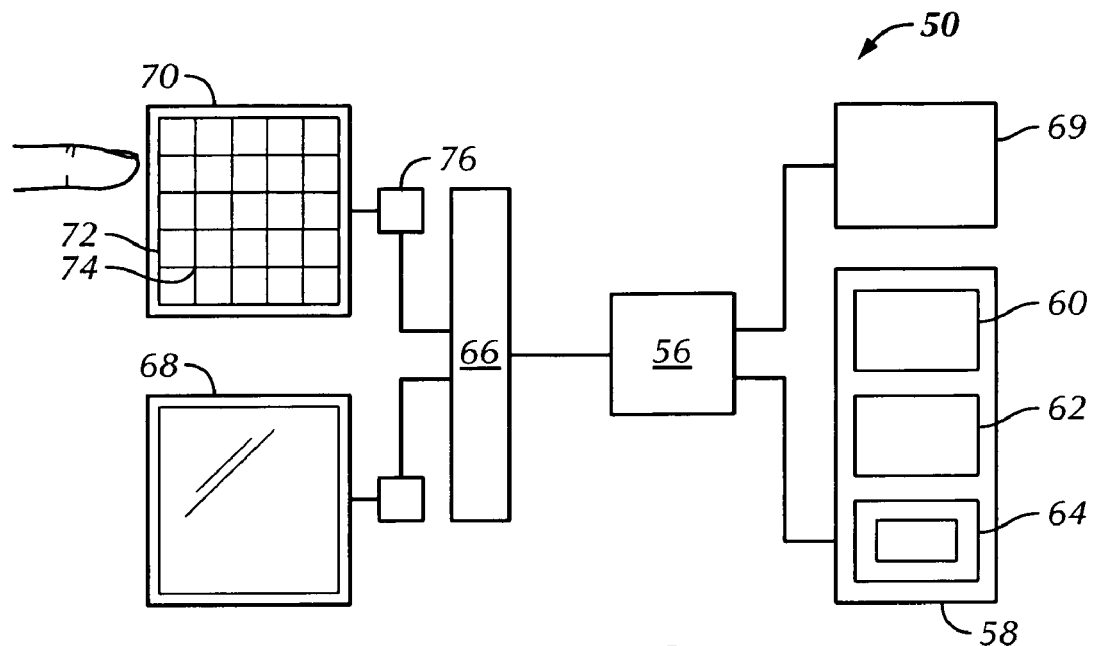
FIG. 2 is a block diagram of a computing device or system incorporating a touch surface device, in accordance with one embodiment of the invention.

FIG. 2 is a block diagram of a computer system 50, employing a multi-touch touch screen. Computer system 50 may be, for example, a personal computer system such as a desktop, laptop, tablet, handheld computer, mobile telephone, digital audio and/or video player, etc. The computer system could also be a public computer system such as an information kiosk, automated teller machine (ATM), point of sale machine (POS), industrial machine, gaming machine, arcade machine, vending machine, airline e-ticket terminal, restaurant reservation terminal, customer service station, library terminal, learning device, etc.

Computer system 50 includes a processor 56 configured to execute instructions and to carry out operations associated with the computer system 50. Computer code and data required by processor 56 are generally stored in storage block 58, which is operatively coupled to processor 56. Storage block 58 may include read-only memory (ROM) 60, random access memory (RAM) 62, hard disk drive 64, and/or removable storage media such as CD-ROM, PC-card, floppy disks, and magnetic tapes. Any of these storage devices may also be accessed over a network. Computer system 50 also includes a display device 68 that is operatively coupled to the processor 56. Display device 68 may be any of a variety of display types including liquid crystal displays (e.g., active matrix, passive matrix, etc.), cathode ray tubes (CRT), plasma displays, etc.

Computer system 50 may include a first input device 69, such as a keyboard or key pad, as well as a touch screen 70, which is operatively coupled to the processor 56 by I/O controller or interface 66 and touch screen controller 76. (The I/O controller 66 may be integrated with the processor 56, or it may be a separate component.) The touch screen 70 is typically a transparent panel that is positioned in front of the display device 68, and may be integrated with the display device 68 or it may be a separate component. Touch screen 70 is configured to receive input from a user's touch and to send this information to the processor 56. In most cases, touch screen 70 recognizes touches and the position and magnitude of touches on its surface.

The host processor 56 receives outputs from the touch screen controller 76 and performs actions based on the outputs. Such actions may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

The host processor 56 may also perform additional functions that may not be related to MT panel processing, and may be coupled to program storage 58 and the display device 68 such as an LCD display for providing a user interface (UI) to a user of the device. In one embodiment, the computer system 50 may be a single device, such as a laptop computer, Apple Ipod™ music/video player, or mobile telephone, having all of the components/modules illustrated in FIG. 2 contained within a single housing of the device.

Figure 3A:
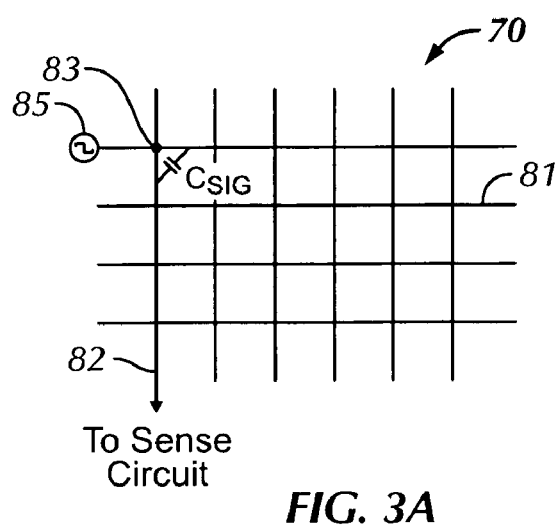
FIGS. 3A and 3B illustrate two possible arrangements of drive and sense electrodes in a touch screen panel, in accordance with two embodiments of the invention.
Figure 3B:
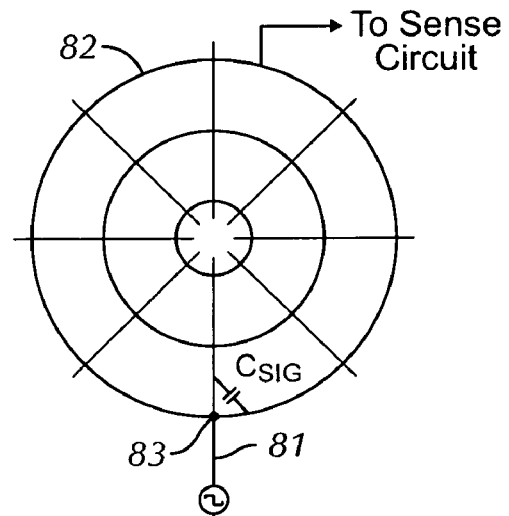

In one embodiment, the touch screen panel 70 can be implemented as a mutual capacitance device constructed as described below with reference to FIGS. 3A and 3B. In this embodiment, the touch screen panel 70 is comprised of a two-layered electrode structure, with driving lines or electrodes on one layer and sensing lines or electrodes on the other. In either case, the layers are separated by a dielectric material (not shown). In the Cartesian arrangement of FIG. 3A, one layer is comprised of N horizontal, preferably equally spaced row electrodes 81, while the other layer is comprised of M vertical, preferably equally spaced column electrodes 82. In a polar arrangement, illustrated in FIG. 3B, the sensing lines may be concentric circles and the driving lines may be radially extending lines (or vice versa). As will be appreciated by those skilled in the art, other configurations based on a variety of coordinate systems are also possible. Additionally, it is understood that the invention is not necessarily limited to touch surface devices utilizing mutual capacitance sensing nodes. The invention may be implemented within other types of touch surface devices such as "self capacitance" devices, for example.

Each intersection 83 represents a pixel and has a characteristic mutual capacitance, $C_{SIG}$. A grounded object (such as a finger) that approaches a pixel 83 from a finite distance shunts the electric field between the row and column intersection, causing a decrease in the mutual capacitance $C_{SIG}$ at that location. In the case of a typical sensor panel, the typical signal capacitance $C_{SIG}$ is about 1.0 picofarads (pF) and the change ($\Delta C_{SIG}$) induced by a finger touching a pixel, is about 0.10 pF. These capacitance values are exemplary only and should not in any way limit the scope of the present invention.

The electrode material may vary depending on the application. In touch screen applications, the electrode material may be ITO (Indium Tin Oxide) on a glass substrate. In a touch tablet, which need not be transparent, copper on an FR4 substrate may be used. The number of sensing points 83 may also be widely varied. In touch screen applications, the number of sensing points 83 generally depends on the desired sensitivity as well as the desired transparency of the touch screen 70. More nodes or sensing points generally increases sensitivity, but reduces transparency (and vice versa).

During operation, each row electrode (i.e., drive electrode) is sequentially charged by driving it with a predetermined voltage waveform (discussed in greater detail below). The charge capacitively couples to the column electrodes (i.e., sense electrodes) at the intersections between the drive electrode and the sense electrodes. In alternative embodiments the column electrodes can be configured as the drive electrodes and the row electrodes can be configured as the sense electrodes. The capacitance of each intersection 83 is measured to determine the positions of multiple objects when they touch the touch surface. Sensing circuitry monitors the charge transferred and time required to detect changes in capacitance that occur at each node. The positions where changes occur and the magnitude of those changes are used to identify and quantify the multiple touch events.

Figure 4:
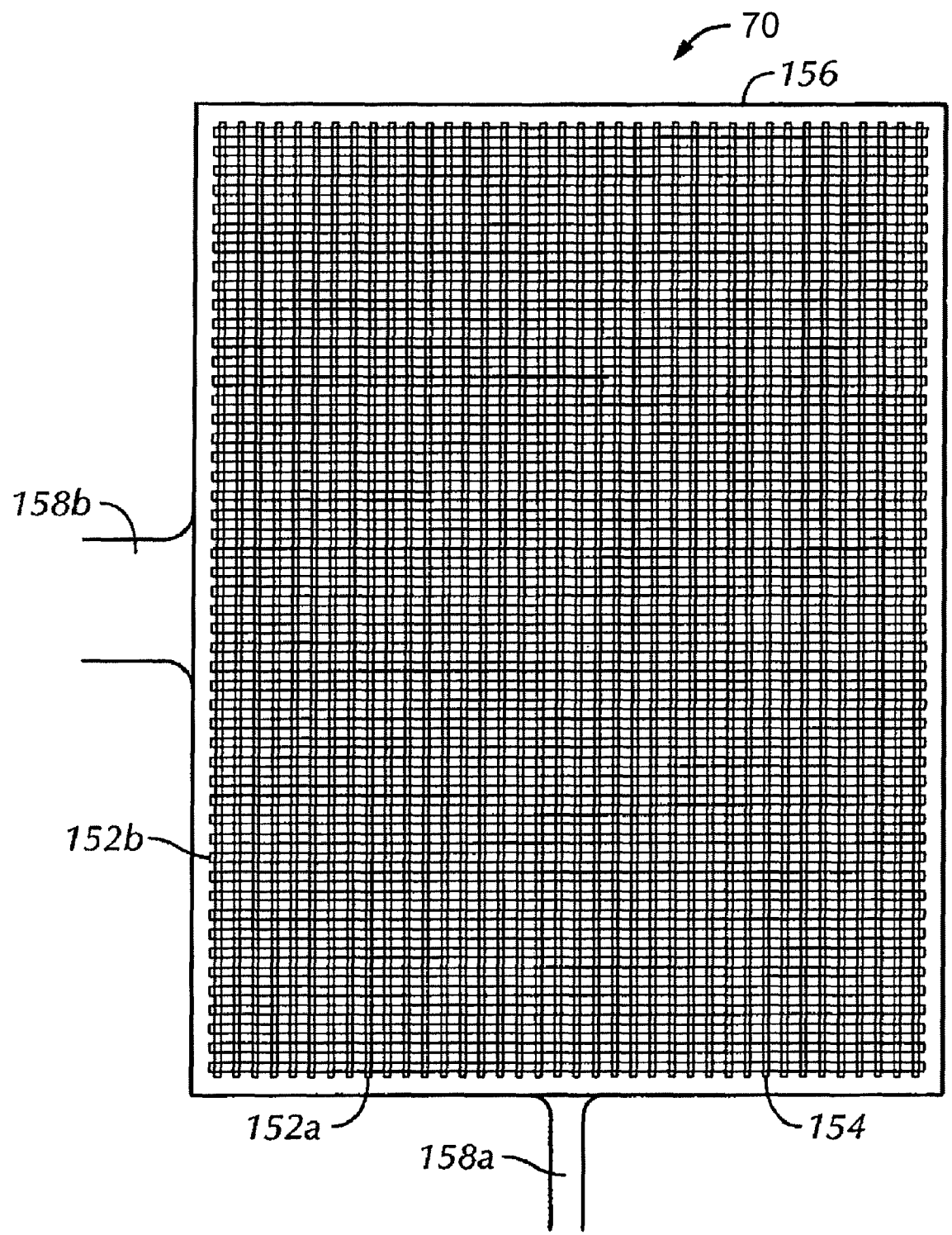
FIG. 4 illustrates a transparent multipoint touch screen, in accordance with one embodiment of the present invention.

FIG. 4 is a top view of a transparent multipoint touch screen 70, in accordance with one embodiment of the present invention. As shown, the touch screen 70 includes a two layer grid of spatially separated lines or wires 152. In most cases, the lines 152 on each layer are parallel to one another. Furthermore, although in different planes, the lines 152 on the different layers are configured to intersect or cross in order to produce capacitive sensing nodes 154 (a.k.a., "pixels"), which each represent different coordinates in the plane of the touch screen 70. The nodes 154 are configured to receive capacitive input from an object touching the touch screen 70 in the vicinity of the node 154. When an object (e.g., a finger tip) is proximate the node 154, the object steals charge thereby affecting the capacitance at the node 154. It has been found that as a finger is pressed more firmly against the touch screen surface 70, the surface area of the finger touching the touch screen 70 increases and a greater amount of charge is diverted away from the underlying sensing node(s) 154.

The lines 152 on different layers serve two different functions. One set of lines 152A drives a current therethrough while the second set of lines 152B senses the capacitance coupling at each of the nodes 154. In one embodiment, the top layer provides the driving lines 152A while the bottom layer provides the sensing lines 152B. The driving lines 152A are connected to a voltage source (not shown) that separately drives the current through each of the driving lines 152A. That is, the stimulus is only happening over one driving line while all the other driving lines are grounded. They may be driven similarly to a raster scan. Each sensing line 152B is connected to a capacitive sensing circuit (not shown) that senses a charge and, hence, capacitance level for the sensing line 152B.

When driven, the charge on the driving line 152A capacitively couples to the intersecting sensing lines 152B through the nodes 154 and the capacitive sensing circuits sense their corresponding sensing lines 152B in parallel. Thereafter, the next driving line 152A is driven, and the charge on the next driving line 152A capacitively couples to the intersecting sensing lines 152B through the nodes 154 and the capacitive sensing circuits sense all of the sensing lines 152B in parallel. This happens sequentially until all the lines 152A have been driven. Once all the lines 152A have been driven, the sequence starts over (and continuously repeats). As explained in further detail below, in one embodiment, the capacitive sensing circuits are fabricated on an application specific integrated circuit (ASIC), which converts analog capacitive signals to digital data and thereafter transmits the digital data over a serial bus to a host controller or microprocessor for processing.

The lines 152 are generally disposed on one or more optical transmissive members 156 formed from a clear material such as glass or plastic. By way of example, the lines 152 may be placed on opposing sides of the same member 156 or they may be placed on different members 156. The lines 152 may be placed on the member 156 using any suitable patterning technique including for example, deposition, etching, printing and the like. Furthermore, the lines 152 can be made from any suitable transparent conductive material. By way of example, the lines may be formed from indium tin oxide (ITO). The driving lines 152A may be coupled to the voltage source through a flex circuit 158A, and the sensing lines 152B may be coupled to the sensing circuits via a flex circuit 158B. The sensor ICs may be attached to a printed circuit board (PCB).

The distribution of lines 152 may be widely varied. For example, lines 152 may be positioned almost anywhere in the plane of touch screen 70. The lines 152 may be positioned randomly or in a particular pattern about the touch screen 70. With regards to the latter, the position of the lines 152 may depend on the coordinate system used. For example, the lines 152 may be placed in rows and columns for Cartesian coordinates or concentrically and radially for polar coordinates. When using rows and columns, the rows and columns may be placed at various angles relative to one another. For example, they may be vertical, horizontal or diagonal.

Figure 5:
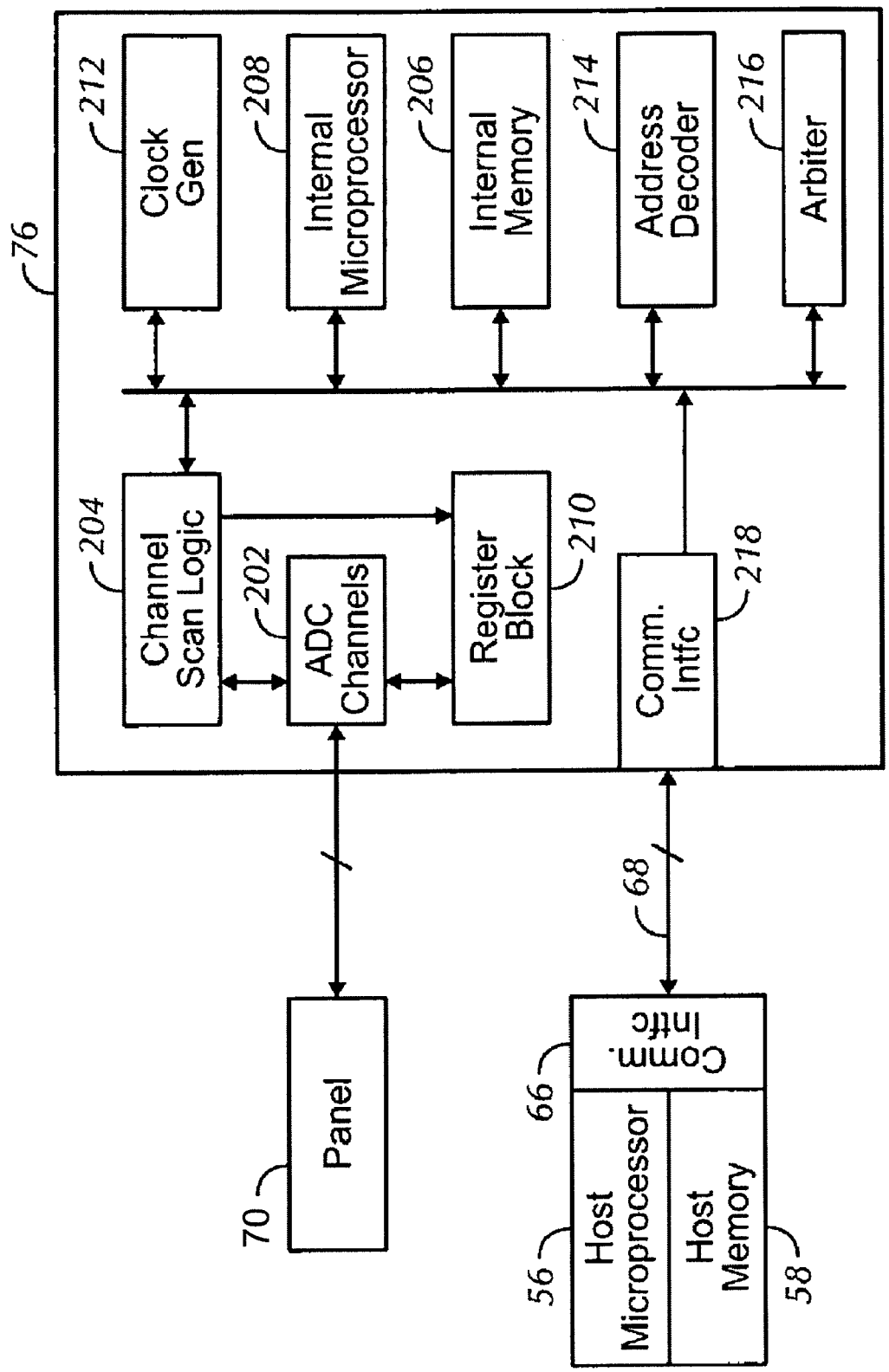
FIG. 5 is a block diagram of a controller having a communication interface that implements a packet communication protocol to access internal and external memories, in accordance with one embodiment of the present invention.

FIG. 5 is a block diagram illustrating various components of the controller 76 (FIG. 2) configured for receiving and processing output sense signals from a touch surface device, in accordance with one embodiment of the invention. The controller 76 includes a data bus 200 through which internal devices or modules communicate. A plurality of analog-to-digital conversion (ADC) channels 202 are coupled to the column (sense) electrodes 82 (FIG. 3A) of the panel 70, for receiving sensed output signals (e.g., $Q_{SIG}$ or $Q_{SIG}-\Delta Q_{SIG}$) from each respective sense line 82, which are indicative of touch or no-touch conditions on the panel 70. The coupling of sense electrodes 82 to the ADC channels 202 may be implemented by a flex circuit 158B (FIG. 4), for example. The ADC channels 202 convert the analog sensed signals from the panel into digital signals having a predetermined digital format and, thereafter, provide the digital signals to a channel scan logic block 204 for further processing.

Each ADC channel 202 may have one or more sense lines 82 coupled to the channel 202. In one embodiment, the plurality of ADC channels 202 includes twelve ADC channels each having a two-to-one multiplexer (not shown) at its input for multiplexing two sense line inputs received from flex circuit 158B. Thus, twenty-four sense lines 82 may be coupled to twelve ADC channels by means of a two-to-one multiplexer located at each channel 202 input. Furthermore, in one embodiment, the plurality of ADC channels 202 each include a charge amplifier (not shown) at its input stage and further provides for output signal compensation, elimination of stray capacitance effects, and mixing for improved signal-to-noise ratios, among other functions. A more detailed discussion of the ADC channels 202 and related circuitry can be found in co-pending and commonly owned application No. 11/650,038, entitled "Minimizing Mismatch During Compensation," filed concurrently herewith, the entirety of which is incorporated by reference herein.

The channel scan logic module 204 receives the digital signals from the ADC channels 202 and stores them as scan results data in internal memory 206. Depending on application and system requirements, the internal memory 206 may include any one or more of a plurality of data storage devices and types (e.g., RAM, ROM, Flash, etc.) that are well known in the art. However, for purposes of simplicity, internal memory 206 is illustrated and discussed herein as a generic, single memory module. When scan results data has been stored for at least one scan of all drive electrodes 81 of the panel 70, the resulting panel "image" is processed by an internal microprocessor 208 to determine whether a touch or multi-touch condition is present on the panel 70. In one embodiment, the channel scan logic module 204 can access internal memory 206 (e.g., RAM), autonomously read data from the analog channels 202, and provide control for the analog channels 202. This control may include multiplexing column/sense electrodes of the panel 70 to the analog channels 202.

The controller 76 further includes a register block or module 210 that contains one or more registers for storing programming and state information used to control timing and operation of the control module 76. A clock generation module 212 provides one or more clock signals to the various modules in the controller 76, as necessary, to provide timing and synchronization to controller operations. An address decoder 214 decodes address signals or packets in order to provide access to corresponding physical addresses or locations within the internal memory 206 to microprocessor 208 and channel scan logic module 204. The controller 76 further includes a bus arbiter 216 for monitoring and controlling access to the data bus 200 by the various modules (e.g., channel scan logic module 204, microprocessor 206, communication interface 218, etc.) contained within the controller 76.

The communication interface 218 allows the controller 76 to communicate with one or more external devices, such as host processor 56, in accordance with a predetermined communication protocol and data format. In various embodiments of the invention discussed in further detail below, communication interface 218 is a serial peripheral interface (SPI)

that contains logic circuitry (e.g., state machines or modules) for autonomously interpreting data packets received from the host microprocessor 56 or other external device and performing memory access functions autonomously (i.e., with little or no intervention from the internal microprocessor 20). The host processor 56 controls access to a host memory 58 and communicates with the controller via a host I/O controller or communication interface 66 having one or more input/output (I/O) lines coupling host communication interface 66 with controller communication interface 218. In one embodiment, communication interface 66 is also a host serial peripheral interface (HSPI) 66 that functions in a similar fashion as the controller SPI 218. In this embodiment, communication between HSPI 66 and SPI 218 may be performed in accordance with a full-duplex protocol.

In one embodiment, controller 76 is implemented as an application specific integrated circuit (ASIC) 76 that contains all the modules (202-218) shown in FIG. 5 within a single ASIC chip package. In alternative embodiments, however, the controller 76 may be implemented as two or more ASIC chips that cooperatively work together and communicate via a data bus.

In one embodiment, upon system 50 (FIG. 2) power up or reset, communication interface 218 allows the control module 76 to boot up with minimal or no intervention (i.e., process steps) performed by the internal microprocessor 208 (FIG. 5). Through a predetermined communication protocol (e.g., packet communication protocol), logic circuitry within the communication interface 218 communicates with an external device, such as host communication interface 66 (FIG. 5), and requests boot program code stored in external memory, such as host memory 58, to be downloaded to internal memory 206 for subsequent execution by the internal microprocessor 208.

In one embodiment, the exchange of commands and program data between the communication interface 218 and the host communication interface 66 is performed in accordance with a predetermined packet communication protocol. The logic modules within the communication interface 218 are configured to autonomously identify and interpret different packet types and perform specified operations in accordance with the packet types received. After completion of downloading of the boot program code into internal memory 206, the internal microprocessor 208 can be configured to initiate execution of the boot program beginning at a pre-specified location of the internal memory 206. This boot-up packet protocol reduces system start up time and associated power consumption because the internal microprocessor 208 is not needed to access and download the boot program from the external memory 58. Additionally, since the boot program is stored in external memory, memory size and type requirements for internal memory 206 can be significantly reduced. For example, it is typically desired to store executable code in reprogrammable, non-volatile memory (e.g., Flash memory). However, adding such internal non-volatile memory to the control module 76 would significantly add to its manufacturing costs. Therefore, in this embodiment, since the boot program is stored in external non-volatile memory (e.g., host memory 58), which is already present in the system for other purposes, there is no need for additional Flash or other type of non-volatile memory in the controller 76.

As explained in further detail below, in further embodiments of the invention, the host processor 56 or other external device can perform read, write and read-modify-write operations (collectively, "access operations") to and from the internal memory 206, via communication interfaces 66 and 218, with minimum or no intervention by the internal processor 208. The host communication interface 66 communicates with logic circuitry within the controller communication interface 218 in accordance with a predetermined packet communication protocol. The logic module(s) within the communication interface 218 autonomously interpret commands and addresses sent by the host communication interface 66, based on decoded packet types and thereafter performs corresponding access operations to and from the internal memory 206.

Figure 6:
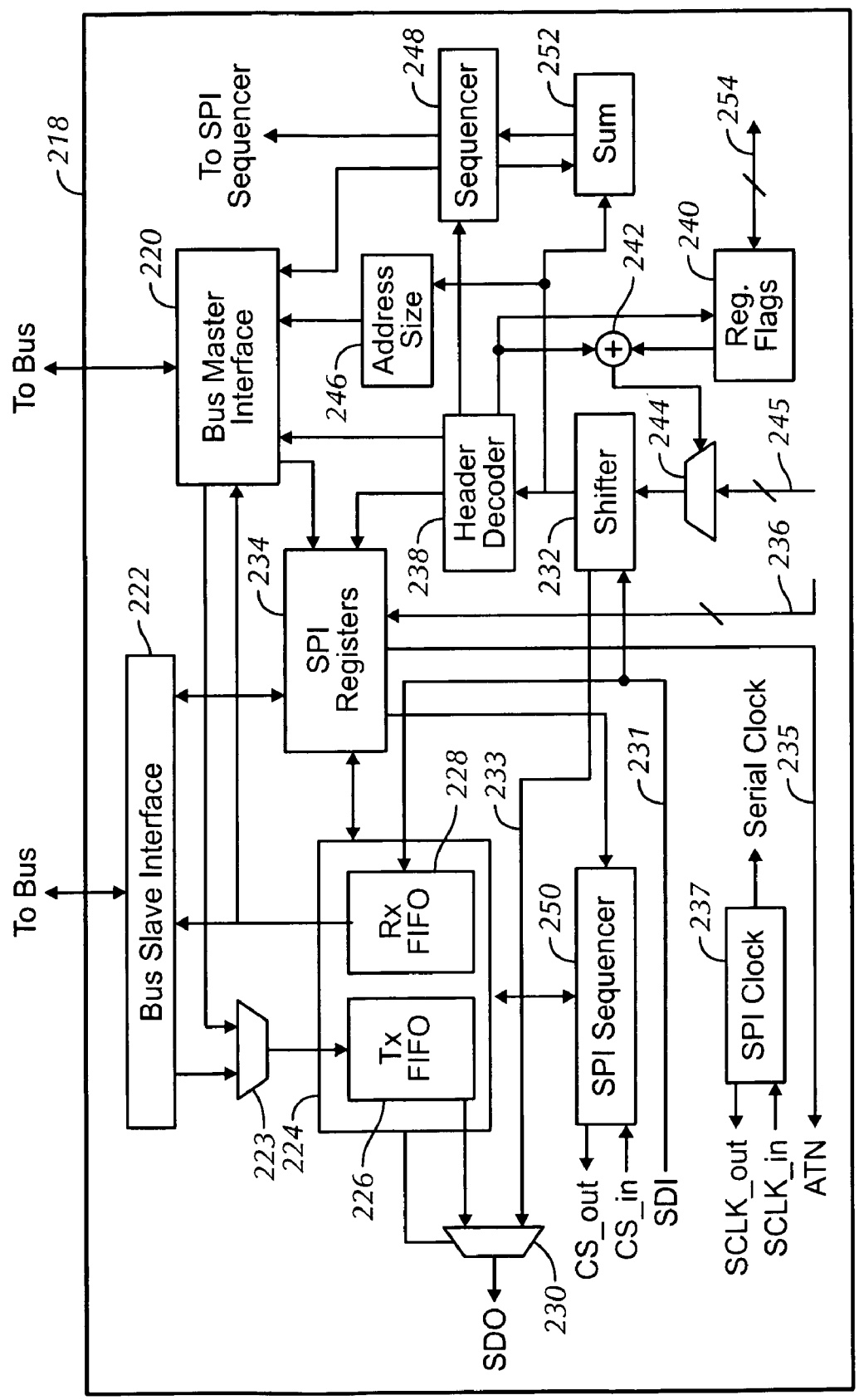
FIG. 6 is a block diagram of a serial peripheral interface that implements a packet communication protocol to perform memory access operations, in accordance with one embodiment of the present invention.

FIG. 6 illustrates a block diagram of communication interface 218 implemented as an exemplary serial peripheral interface (SPI) 218, in accordance with one embodiment of the invention. The SPI 218 includes a Bus Master Interface 220 for communicating with a Master device (not shown) when the controller 76 containing the SPI 218 is operating in a Slave mode. A Bus Slave Interface 222 serves as an interface for communicating with a Slave device, e.g., a second controller or ASIC (not shown) operating in Slave mode, when the primary controller 76 is operating in Master mode.

The SPI 218 further includes a memory 224 that includes a first-in-first-out (FIFO) storage device 226 (TX FIFO 226) for storing data to be transmitted to an external device or module (not shown) and a FIFO storage device 228 (RX FIFO 228) for storing data received via data input line 229. A multiplexer 230 has a first input connected to an output of the FIFO 226 and a second input coupled to an output line 231 of a shifter 232, which receives data via data input line 231 and shifts the data out to an external device (e.g., host 56) via multiplexer 230. The TX FIFO 226 can receive data to be stored and transmitted from either the Master or Slave interfaces 220 or 222, respectively, via a multiplexer 223.

A SPI register block or module 234 includes one or more registers for storing programming and state values, which are utilized by the SPI 218 to control timing and operation of its modules. The SPI register block 234 further includes an attention (ATN) line 235 coupled to an I/O line of an external device. When the controller 76 wishes to initiate communications with the external device, appropriate registers are programmed within the SPI register block 234 and the ATN line 235 is set either high or low. The external device senses the high or low state of the ATN line 235 and initiates a predetermined packet communication protocol. The SPI register block 234 further includes one or more input lines 236 receiving register programming data from an external device. A SPI clock module 237 further generates a serial clock for use by the various modules of the SPI 218 to synchronize and clock its internal operations.

The shifter 232 also receives commands and/or control data (e.g., REQ_BOOT, ACK_WAKEUP, etc.) from multiplexer 244 and shifts the commands and/or control data out to an external device via output line 233 and multiplexer 230. The shifter 232 further includes a second output coupled to the input of packet header decoder 238, which decodes packets received from an external device in accordance with a predetermined packet format and protocol and thereafter updates appropriate register flags in register flags module 240. If the packet decoded by the header decoder 238 is a command packet, the header decoder 238 further sends the decoded header information to micro-sequencer 248, which is programmed or configured to execute microinstructions corresponding to the command. The micro-sequencer 248 further includes an output coupled to SPI sequencer 250 for synchronizing SPI microinstructions with operations performed by the external device (e.g., host processor 56).

In one embodiment, when operating in either a Master or Slave mode, the SPI 218 can receive or transmit data packets containing one or more frames, each frame containing a plurality of bits (e.g., 8, 16 or 32 bits) of data. The FIFO memories 226 and 228 can support burst and/or direct memory access (DMA) transfers of a plurality of bytes (e.g., 16 bytes). Additionally, the SPI 218, via Bus Master and Slave Interfaces 220 and 222, respectively, can support read request, write request, read-modify-write request and/or sequence memory request commands received from an external device. These commands are discussed in further detail below.

A register flag module 240 stores various register flag bits that are set or reset in order to indicate a current state or operation being performed. The register flag module 240 includes a plurality of I/O lines for transmitting and receiving register flag set/reset information to and from an external device. This register flag set/reset information is used to control SPI 218 operations and synchronize them with operations performed by the external device. Another output of the register flag module 240 is summed with an output of the packet header decoder 238 via summing circuit 242. The output of the summing circuit 242 is a selection control signal provided to multiplexer 244. Depending on the selection control signal, the multiplexer 244 will provide an appropriate packet (e.g., command, request, acknowledgement or status packet) to the shifter 232 for transmission out to an external device, as discussed above. In one embodiment, the multiplexer 244 selectively provides a plurality of control signals (e.g., REQ-BOOT, ACK_WAKEUP, NAK_NA, NAK_ERR, ACK_WR-REQ, ACK_DATA, NOP) via one or more input lines 245 and provides them selectively one at a time to the shifter 232. In one embodiment, the plurality of control signals are stored as constants in a memory, e.g., ROM or a table, having a plurality of outputs coupled to corresponding input leads or traces of the multiplexer 244.

An address/size module 246 is used to latch address and size frames received from the shifter 232. The address indicates a memory location to be accessed to perform read, write or read-modify-write operations. The size information indicates the amount of data involved (e.g., no. of bytes or frames) in the operation. The address and size frames are also provided to a check sum circuit 252 having an input and output coupled to the micro-sequencer 248 for performing data integrity operations.

In one embodiment of the invention, upon power-up or reset of the controller 76, the internal microprocessor (e.g., an ARM968 processor) executes a single "Wait for Interrupt" (WFI) instruction. Thereafter, the SPI 218 is automatically configured to implement a predetermined packet communication protocol on top of the known standard SPI protocol without intervention by the internal microprocessor 208. In one embodiment, the predetermined packet communication protocol allows access to any system 50 memory through packetized boot request, memory read, write and/or read-modify-write operations, as well as a packetized mechanism for moving large data images to auto-incremented address locations on the data bus 200 (e.g., similar to a DMA operation).

Through a packetized boot request protocol and mechanism, logic circuitry within the SPI 218, as described above, can access a boot program (e.g., code and/or firmware) from external memory 58 and load the boot program into internal memory 206, without intervention by the internal microprocessor 208. After the boot program has been loaded into the internal memory 206, and appropriate register states and flags have been set, the internal processor 208 wakes up and begins executing boot program instructions from a pre-specified location in the internal memory 206.

In one exemplary implementation, upon power-on or reset, a power manager module (not shown) contained within the controller 76 sends a power manager boot request signal (PMgr_BootReq) to the SPI register block 234 via input line 236. The PMgr_BootReq command packet is also sent to the register flags module 240 via one of the plurality of I/O lines 254. The PMgr_BootReq signal sets a BootReq flag (not shown) within the register flags module 240. Upon setting of the BootReq flag, a boot request command (REQ_BOOT) is loaded from a SPI memory, e.g., a ROM or table (not shown), into the shift register or shifter 232. The PMgr_BootReq signal also sets appropriate state registers within the SPI Registers module 234, which in turn causes the ATN line 235 to be pulled low. The ATN line 235 is coupled to one of the plurality of I/O lines 68 (FIG. 5) used for transmitting data and commands between the host serial peripheral interface (HSPI) 66 (FIG. 5) and the SPI 218. In one embodiment, the I/O lines 68 support and provide full-duplex communication channels between the HSPI 66 and the SPI 218.

The HSPI 56 responds to the ATN signal by sending an acknowledgement command (ATN_ACK) packet back to the SPI 218 via I/O lines 62 and data input line 231. At the same time, the SPI 218 sends the REQ_BOOT command packet to the HSPI 66 via output line 233 and multiplexer 230. The shifter 232 sends at least a header portion of the ATN_ACK packet to the packet header decoder 238 and then the decoded signal is sent to the register flag module 240. Appended to or following the ATN_ACK packet are frames containing size information which are transmitted from the HSPI 56 to the shifter 232, which are subsequently transmitted to the header decoder 238, the SPI registers 234 and the address/size registers 246, as described above. Based on the size information (e.g., number of frames being transmitted), the SPI 218 transmits a corresponding number of "no operation" (NOP) commands, thereby pulling the corresponding number of boot program frames or packets from the external memory 58 via HSPI 66, in accordance with a full-duplex communication protocol. The boot program frames are error checked and then loaded into the internal memory 206 for execution by the internal processor 208. In this way, a boot operation is performed by a packet-based communication protocol executed entirely by the logic modules in the SPI 218, without intervention by the internal processor 208.

As mentioned above, in further embodiments, the SPI 218 can perform additional memory access operations such as read, write and read-modify-write operations to the internal memory 206, utilizing a packet-based communication protocol without intervention by the internal microprocessor 208.

To perform a read operation, for example, HSPI 66 sends a memory read request (REQ_MEMRD) command packet to the SPI 218. In one embodiment, a memory read address and checksum value is sent with or appended to this command. If the communication protocol is a full-duplex protocol, SPI 218 will send an appropriate number of NOP frames back to the HSPI 66. The command packet is decoded by header decoder 238 and the micro-sequencer 248 starts executing microinstructions for the command. A checksum operation is performed on the address and size data and if data integrity is verified, the address and size data is latched to address/size register 246. The micro-sequencer 248 generates and provides a read command to the Master interface 220. At the same time the address/size latch 246 provides the read address and number of frames to the Master interface 220. The Master interface then retrieves the data from the designated memory address of the internal memory 206 and stores it within the TX FIFO 226. Thereafter, appropriate register bits are set in the SPI register block 234, which asserts the attention (ATN) signal line to the HSPI 66. The HSPI 66 thereafter transmits an ATN_ACK signal appended with an appropriate number of NOP frames to pull the read data from the TX FIFO 226. In this way, data from the internal memory 206 can be read by the external host device 56 via a packet-based communication protocol, without intervention by the internal microprocessor 208.

A packet-based communication protocol write operation can be performed in a similar fashion as the read operation described above. In one embodiment, the HSPI 66 sends to the SPI 218 a memory write request command (REQ_MEMWR) appended with a memory write address, an address checksum, the data to be written, and a data checksum. The header of the command is decoded by the header decoder 238 and then the micro-sequencer 248 begins executing micro instructions for the command. Checksum operations are performed as discussed above and if successful, write address and data size information is latched into the address/size register 246. Write data temporarily stored in the RX FIFO 228 is latched into a data register (not shown) within the Master interface 220, from where it is subsequently written to the corresponding memory address. Upon completion of the write operations, appropriate registers in SPI register block 234 are set, and the ATN line 235 is asserted to the host processor 56. The host processor 56 thereafter transmits an ATN_ACK packet to pull a write request acknowledgement packet (ACKD_WRREQ) from the SPI 218.

A read-modify-write operation can also be executed by the packet-based communication protocol described herein. In the one embodiment, HSPI 66 sends to the SPI 218 a read-modify-write command packet (REQ_MEMRMW) appended with a memory read/write address, address checksum, data, bit write mask, and data/mask checksum. The command packet is decoded by header decoder 238 and then micro-sequencer 248 starts executing micro instructions for the command. Checksum operations are performed as discussed above and if successful, read/write address and data size information is latched into the address/size register 246, and a read request is presented to the Master interface 220 along with the address and size data from the register 246. Retrieved read data is latched into a read register (not shown) within the Master interface 220 and mask data is latched to as mask register (not shown) within the Master interface module 220. Write data is then retrieved from the RX FIFO 228 and used to update the data in read register using the mask data latched in the mask register. Thereafter, the micro-sequencer 248 presents a write request to the Master interface 220 with the address, size and modified data in the read register. Upon completion of the write operations, appropriate registers in SPI register block 234 are set, and the ATN line 235 is asserted to the HSPI 66. The HSPI 66 thereafter transmits an ATN_ACK packet to pull a write request acknowledgement packet (ACKD_WRREQ) from the SPI 218.

In a further embodiment, since the SPI 218 supports memory read, write, and read-modify-write access operations to some or all of the controller's memory map, it is possible to interrogate or modify system and/or register state to determine the cause of any errant functional/firmware operation should it be required. Those of skill in the art can design and implement the appropriate access operations and corresponding logic to perform such debugging operations without undue experimentation.

As illustrated by the exemplary embodiments above, by utilizing a predefined packet and communication protocol, various functions and operations can be performed between two or more devices in a system, with no or minimal intervention by an internal processor within at least one of the devices. In one embodiment, a packet-based communication protocol for performing various access functions and operations without intervention by an internal microprocessor of the device or chip performing the functions, utilizes the following four basic packet types: (1) Command (CMD): defines an action to be taken on the part of the receiver; (2) Data (DT): indicates that a packet having 1 to 16384 Words (4 to 65536 Bytes) are to be transmitted to the receiver; (3) Acknowledge (ACK): indicates that the operation requested by the transmitter has been received and decoded properly; and (4) Results Ready (RDY): indicates that one device (e.g., controller 76) has results (e.g., panel scan data) that are ready to be transmitted to a second device (e.g., host processor 56).

As will be apparent to those of ordinary skill in the art, the format of the packets and packet headers can be implemented in many different ways. For example, in one embodiment, a packet may be formed by a dynamically variable number of frames, each frame containing any desired number of bits (e.g., 8, 16 or 32 bits). The format for the packet header can also be implemented in any number of ways. For example, the packet header may be designed to have sixteen bits designated as bits [15, 14, 13 . . . 0], bit [15] being the most significant bit. In one exemplary embodiment, the most significant bit is set to the value zero and the least significant bit is set to the value one. Bits [14, 13] of the header are an indication of the packet type being transmitted, and bits [12, 11] are the inversion of the packet type. This redundancy assures the packet type will be properly detected. Finally, bits [4, 3] can be used to specify the size of the command packet and, in one embodiment, define the number of contiguous bytes written when the command indicates a memory write or read-modify-write operation, as discussed above. Again for redundancy, bits [2, 1] are used to indicate the inversion of the size field. For other types of packet commands these bits can be ignored and are to zero.

In one embodiment, the following values of bits [14, 13] correspond to the following packet types: 00 (Command); 01 (Data); 10 (Acknowledge); and 11 (ResultsReady).

In one embodiment, the Command packet is used to either initiate an autonomous action by the host processor 56, or a request from the controller 76 for the host 56 to perform an action on behalf of the controller 76. When the host 56 is autonomously initiating an action, HSPI 66 will assert a chip select signal to SPI sequencer 250 and begin transmitting a corresponding Command packet. When the controller 76 is requesting the host 56 to initiate some action, the SPI 218 will first assert its ATN_line to the HSPI 66, as discussed above, and then the HSPI 66 will respond by transmitting an ATN_ACK command which will in turn "pull" the request from the SPI 218.

Table 1 below provides a list of exemplary command packets and their attributes that may be utilized in various embodiments of the invention. The term "Zephyr2" refers to an exemplary implementation of a controller 76 designed by Apple Computer, Inc. of Cupertino, Calif.

TABLE 1

| Code | Meaning | Initiator | # SPI Frames | Comments |
|---|---|---|---|---|
| 000 | NOP | — | 1 | Packet type sent by HSPI or ZSPI |
| 001 | REQ_WAKEUP | HSPI | 1 | Forces Zephyr2 to wakeup and start clocks |

TABLE 1-continued

| Code | Meaning | Initiator | # SPI Frames | Comments |
|---|---|---|---|---|
| 010 | ATN_ACK | HSPI | 1 | ATN_de-asserted by ZSPI when this command received |
| 011 | REQ_HACC | HSPI | 1 | Flips the "access mode" of the Host SPI interface from "normal" (used during active Zephyr2 scanning mode when results will be transmitted from zephyr2 to the external host) to "privileged" (used to provide exclusive Host SPI access to Zephyr2 memory space). This is discussed in section 4 below. |
| 100 | REQ_MEMRD | HSPI | 5 | Memory read address and checksum sent with this command |
| 101 | REQ_MEMWR | HSPI | 7 | Memory write address, address checksum, data, and data checksum sent with this command |
| 110 | REQ_MEMRMW | HSPI | 9 | Memory write address, address checksum, data, bit write mask, and data/mask checksum sent with this command |
| 111 | REQ_CAL | HSPI | 1 | Forces Zephyr2 to begin a calibration sequence. Note that the external 32 KHz reference clock, input on CLK_IN, must be running and stable at this time. |
| 111 | REQ_BOOT | ZSPI | 1 | ATN_asserted to interrupt HSPI |

Acknowledge packets are issued by either the host SPI (HSPI) or the controller SPI 218 (e.g., Zephyr2 SPI (ZSPI)) to indicate whether previously transmitted packets were received successfully (or not). When the HSPI 66 desires to send an Acknowledge packet it asserts the CS_in line to SPI sequencer 250 and initiates the transfer of the packet to SPI 218. When SPI 218 desires to transmit an Acknowledge Packet, it will first assert the ATN line 235 to the HSPI 66. When the HSPI 66 issues the subsequent Command Packet with an ATN_ACK command code, SPI 218 will issue the Acknowledge Packet it desires to transmit to the HSPI 66.

After receiving an ATN_signal from SPI 218, the HSPI 66 issues one ATN_ACK command frame, thereby pulling an Acknowledge Packet header from SPI 218 containing an acknowledge read request code (e.g., 1000). When the HSPI interprets the Acknowledge packet header, thereby determining that SPI 218 wishes to transmit memory read result data, for example, it will subsequently issue a corresponding number of NOP command packets to pull the remaining SPI 218 frames containing the memory read data and the data checksum. In one embodiment, if the Acknowledge packet from SPI 218 contains a no acknowledgement error code (e.g., NAK_ERR=1111) then the HSPI 66 will not issue the NOP command packets but will instead re-issue the original memory read command packet.

Table 2 below provides a list of exemplary Acknowledge packets and their attributes that may be utilized in various embodiments of the invention.

TABLE 2

| Code | Meaning | Sent by | # SPI Frames | Comments |
|---|---|---|---|---|
| 0000 | NOP | — | 1 | |
| 0001 | Reserved | — | — | |
| 0010 | CAL_DONE | ZSPI | 1 | Indicates that a previously requested calibration sequence has been completed. (Note that a calibration sequence for the LFO and FLL is initiated by HSPI issuing a REQ_CAL command packet to ZSPI. |
| 0011 | Reserved | — | — | |
| 0100 | ACK_WAKEUP | ZSPI | 1 | Indicates Zephyr2 is awake and awaiting HSPI accesses. |
| 0101 | ACK_WRREQ | ZSPI | 1 | Indicates the previously issued Memory Write or Memory Read-Modify Write command from the HSPI to the ZSPI was received successfully. |
| 0110 | Reserved | — | — | |
| 0111 | ACK_DATA | either | 1 | Indicates that the last transmitted data packet was received successfully. From the HSPI this will be issued in response to either a memory read response or Results Packet was received ok. For the ZSPI it will be issued in response to a Data Packet. |
| 1000 | ACK_RDREQ | ZSPI | 4 | Issued by the ZSPI with 32 bits of memory read data in response to a memory read command from the HSPI. (Therefore it also indicates that the original Memory Read command was received and decoded successfully.) |
| 1001 | Reserved | — | — | |
| 1010 | | | | |

TABLE 2-continued

| Code | Meaning | Sent by | # SPI Frames | Comments |
|---|---|---|---|---|
| 1011 | | | | |
| 1100 | | | | |
| 1101 | ACK_HACC | ZSPI | 1 | Indicates that the REQ_HACC command has been successful Note that this packet must be scheduled to be sent by firmware (i.e.. by writing this to the ZSPI transmit FIFO: it is not generated by hardware). |
| 1110 | NAK_NA | ZSPI | 1 | Indicates that the Command Packet or Data Packet just received will be ignored since the ZSPI is in exclusive "results packet" mode (see section 4 below. |
| 1111 | NAK_ERR | either | 1 | Issued by either the HSPI or ZSPI to indicate that the last transmitted command or data packet was not received successfully in which case it must be re-transmitted. |

The ResultsReady data packet is issued by the SPI 218 to indicate it is transmit panel scan results received from the touch panel 70 (FIG. 2), for example, to the host processor 56 (FIG. 5). In one embodiment, a sequence of operations can be implemented as follows:

1) Firmware within the controller 76 creates a ResultsReady packet, including a header and checksum, and sets up a direct memory access (DMA) transaction to transmit the data over the SPI 218.

2) SPI 218 asserts the ATN line 235 to the HSPI 66.

3) HSPI 66 responds by transmitting Command packet with an ATN_ACK command code and simultaneously pulls the ResultsReady packet header from the SPI 218.

4) Upon determining that SPI 218 wishes to send results data, HSPI 66 then pulls two more frames from SPI 218 by sending two NOP frames to SPI 218. The first frame SPI 218 contains the number of Bytes in the results data and the second frame contains the inverse (bit by bit) of this number.

5) The HSPI 66 then determines the number of 16 bit frames of results data must be pulled from SPI 218 and then transmits this many NOP command frames to retrieve the results data.

As discussed above, during normal operation, the controller 76 will produce a set of data that represents the results of scanning the touch-sensitive panel 70 (FIG. 2) for user touch and/or no-touch conditions. In one embodiment, the packet-based protocol described above is utilized to transmit the results data over the host interface 66 to the external host processor 56, with minimal or no intervention by the internal microprocessor 208 of the controller 76. Thus, this packet-based protocol provides a mechanism for transferring the results data in an efficient, power-saving and reliable manner by packetizing the results data in a predefined fashion. In one embodiment, the frequency of results packet transfers as well as the amount of data per packet is not predefined and is flexible on a transfer-by-transfer basis.

Thus, as described above, a packet-based communication protocol supports memory access operations to system memory space as well as transferring results to an external device, with minimal or no intervention by an internal processor of a device. In one embodiment, the SPI 218 can be configured to either exclusively allow memory access (e.g., memory read, write, read-modify-write operations), or exclusively allow the transfer of results packets. In one embodiment, after the boot process is completed the external host 56 can set a register state bit within the SPI register block 234 via a register write command. After this bit has been set, only Command packet headers corresponding to the selected mode will be recognized by the header decoder 238. All other Command packets will be ignored.

Figure 7:
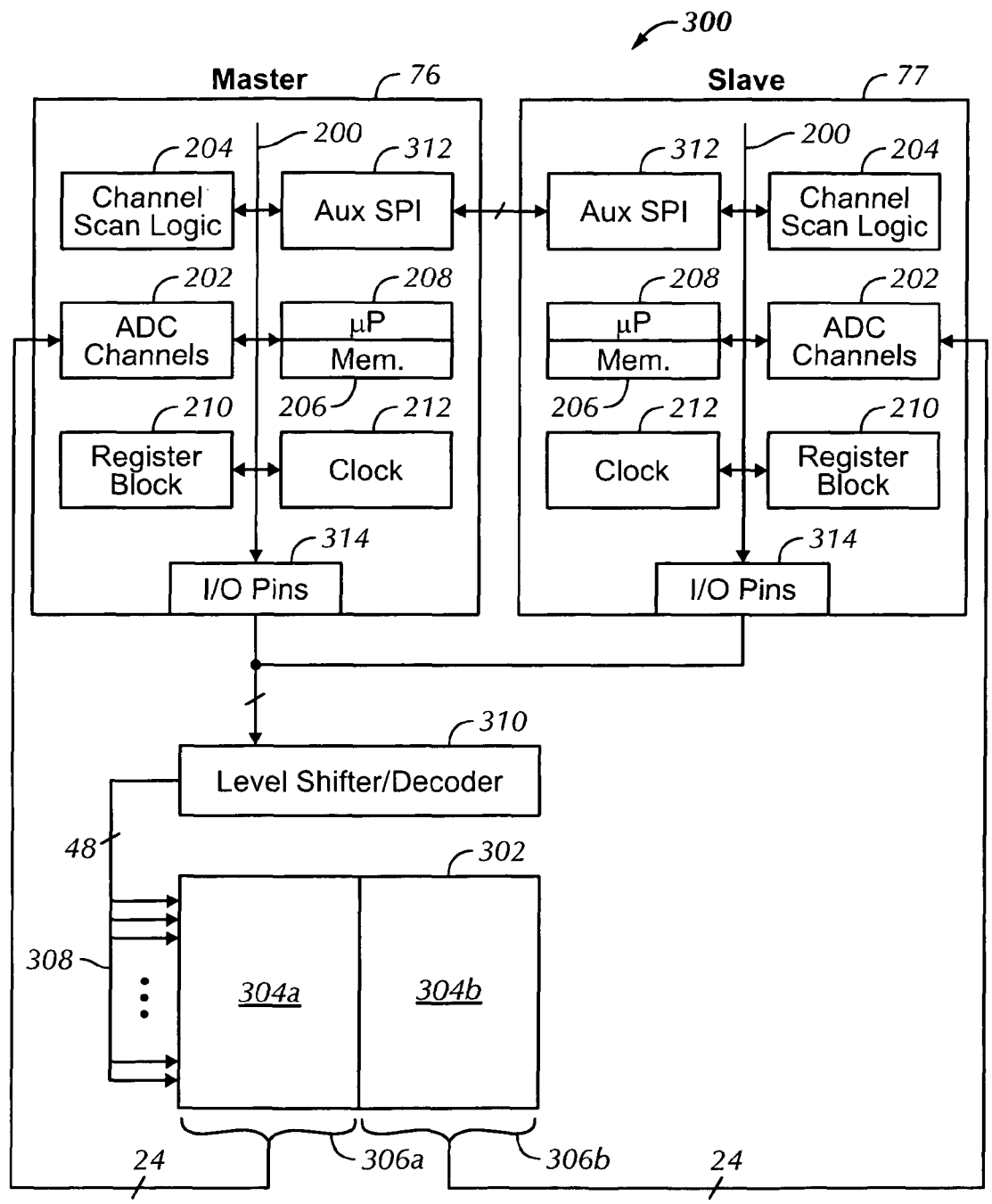
FIG. 7 is a block diagram of a touch surface system having Master and Slave controllers, in accordance with one embodiment of the present invention.

FIG. 7 illustrates a block diagram of a touch surface system 300 having two controllers 76 and 77, respectively, operating in a Master/Slave configuration to process and/or control input and output signals to and from a touch surface panel 302, in accordance with one embodiment of the invention. In this embodiment, the touch surface panel 302 may be configured as shown in FIG. 3A and include a plurality of row (drive) electrodes 81 separated by a dielectric from a plurality of column (sense) electrodes 82, which are generally orthogonal to the row electrodes 81. As described above, each intersection of a drive electrode 81 and a column electrode 83 forms a mutually capacitive sense node 83 having a mutual capacitance of $C_{SIG}$. For example, the panel 302 may include forty-eight drive electrodes 81 and forty-eight sense electrodes 82, forming a (48×48) pixel matrix.

For purposes of processing output sense signals, the touch panel 302 may be divided into two or more sub-panels. In the exemplary embodiment illustrated in FIG. 7, the touch panel 302 is divided into two panel halves 304a and 304b each having twenty-four column (sense) electrodes 82, for example. Each column electrode 82 in the first panel half 304a is coupled to a corresponding one of twenty-four output sense lines 304a that provide output sense signals to the Master ADC Channel block 202 in the Master controller 76. Similarly, each column electrode 82 in the second panel half 304b is coupled to a corresponding one of twenty-four output sense lines 306b that provide output sense signals to the Slave ADC Channel block 202 in the Slave controller 77.

The panel 302 further includes forty-eight row (drive) electrodes 81 traversing both panel halves 304a and 304b, thereby forming a 48×48 pixel matrix for the entire panel 302. Each row electrode 81 is coupled to a respective one of forty-eight drive signal lines 308 coupled to the output of a level shifter/decoder circuit 310 for generating drive signals of a desired amplitude and decoding timing signals from the microprocessor 208 of the Master controller 76. The level shifter/decoder 310 thereafter applies the drive signal to a selected one of the plurality of drive lines 308.

In one embodiment, the Master and Slave controllers 76 and 77, respectively, are each implemented as an ASIC chip. Each ASIC 76 and 77 receives analog signals (e.g., voltage waveforms) from column electrodes 82 (FIG. 3a) in respective halves 304a and 304b of the touch surface panel 302. These analog signals indicate a touch or no-touch condition at a respective capacitive sensing node 83 corresponding to an intersection of a column electrode 82 and a selected, driven row electrode 81 of the touch surface panel 302.

In one embodiment, ASIC 76 is identical to ASIC 77, each including some or all of the components discussed above with respect to FIG. 5. As illustrated in FIG. 7, each ASIC 76 and 77 includes a data bus 200, a plurality of analog-to-digital conversion (ADC) channels 202, a channel scan logic module 204, internal memory 206, a microprocessor 208, a register block and a clock generator 212. These modules serve the same functions discussed above with respect to FIG. 5. Each ASIC 76 and 77 further includes an auxiliary serial peripheral interface (ASPI) 312 and a plurality of input/output (I/O) pins 314. As discussed in further detail below the ASPI's 312 and I/O pins 314 are used to provide data, commands and clock signals between ASIC 76 and ASIC 77 when operating in Master/Slave mode. The functionality of the ASPI's 312 and I/O pins 314 are described in further detail below.

One advantage of providing two ASIC's 76 and 77 to process the output signals of respective panel halves 304*a* and 304*b*, as shown in FIG. 7, is that the size and cost of the ASIC's 76 and 77 can be kept relatively small. For example, when the panel 302 outputs are generated as charge waveforms, the ADC channels 202 of each ASIC 76 and 77 typically include a plurality of charge amplifiers and feedback capacitors at their input stages for receiving signals from corresponding output sense lines 82 of the panel 302. These charge amplifiers and feedback capacitors typically require relatively large portions of the ASIC's die "real estate" and, therefore, it is advantageous to minimize the number of charge amplifiers and capacitors. Additionally, each ASIC 76 and 77 may be programmed via state registers in respective register blocks 210 to operate in either a stand-alone mode, a Master mode, or a Slave mode. Thus, for smaller panels 302 having only 24 column sense lines 82, for example, a single ASIC 76 operating in stand-alone mode can function as the controller for that panel. For a larger panel, two or more ASIC's can receive output signals from the panel 302 and operate in a Master/Slave configuration. In one embodiment, there may be one Master ASIC 76 and two or more Slave ASIC's 77, depending on the size of the panel and number of column sense lines 82.

Thus, operating two or more ASIC's 76 and 77 in a Master/Slave mode of operation provides modularity and easy configurability of the touch surface system 300 in that a single ASIC design can provide the necessary control for many different panel sizes. As the panel size increases, additional Slave ASICs 77 can be added to process the additional output signals. Such modularity can provide significant cost efficiencies when designing the ASIC 76, 77 and lower costs when manufacturing different products having different panel sizes.

Additionally, in one embodiment, utilizing two ASIC's 76 and 77 in a Master/Slave configuration reduces system 300 power consumption because portions of the Slave ASIC 77 logic or circuitry may be shut down. For example, in one embodiment, the Master microprocessor 208 in the Master ASIC 76 performs processor functions for both the Master and Slave ASIC's 76 and 77, such as generating and sending timing or decoder signals. In a further embodiment, only the Master channel scan logic block 204 is used to generate the timing and drive waveforms necessary to scan the sensor panel 302. Thus, this functionality is disabled for the Slave channel scan block 204. The timing and drive waveforms generated by the Master ASIC 76 are provided to the level shifter/decoder 310, which amplifies the drive waveforms (e.g., from 3.3 $V_{p-p}$ to 18 $V_{p-p}$) and decodes the timing signals to drive each row of the touch surface panel 302 in sequence.

Additionally, the Master channel scan unit 204 is the only one which sends row count information to the level shifter/decoder module 310. The Slave channel scan unit 204 observes this interface between the Master channel scan unit 204 and the level shifter/decoder module 310 to ascertain the current row count number.

In one embodiment, the only task the Slave channel scan unit 204 performs is generating timing sequences for the Slave ADC channels 202 upon receiving a START signal from the Master, and obtaining result data from panel half 304*b* (in Scan-Assist mode) or comparing result data against a threshold to determine if a touch event has occurred on panel half 304*b* (in Auto-Scan or Sleep mode). Hence, other circuits and/or modules not involved in these functions may be disabled. In this embodiment, the Slave channel scan logic 204 need not communicate with the Slave microprocessor 208 at all. The Master channel scan unit 204 provides a clock signal, and a START signal (e.g., a pulse or coded signal) to Slave channel scan unit 204 through respective I/O pins 314 to start Slave timing sequences. In one embodiment, the Master ASIC can provide one or more coded signals to the Slave ASIC via the I/O pins 314 to perform corresponding operations (e.g., start, power down, clear registers, etc.).

In one embodiment, in Scan-Assist mode, the Master channel scan unit 204 sends a command to the Slave ASPI 312 to move result data from a Slave register 210 to a Master register 210. The results data stored in Master register 210 is then stored (e.g., burst mode) in Master memory 206 to be processed by Master microprocessor 208. In Auto-Scan mode, both Master and Slave channel scan logics 204 compare the obtained result data against a threshold value stored in register block 210, for example. If the Slave detects a signal level that exceeds the threshold value, it will inform the Master through a dedicated I/O pin 314. Alternatively, the Slave may send an interrupt signal to "wake up" the Master from low power sleep mode through one of the I/O pins 314.

In one embodiment, the Slave microprocessor 208 in the Slave ASIC 77 is completely or at least partially shut down in order to minimize power consumption by the Slave ASIC 77. Additionally, in one embodiment, the Slave clock generator 212 in the Slave ASIC 76 is also shut off and the Slave ASIC 77 receives clock signals from the Master clock generator 212 in the Master ASIC 76 via the Master and Slave ASPIs 312 or dedicated Master and Slave I/O pins 314. By shutting down the Slave clock 212 in the Slave ASIC 77, power consumption by the Slave 77 is significantly decreased. In a further embodiment, the Slave ASIC 77 further receives all program and operation data (e.g., tables, constants, register states, etc.) from the Master ASIC 77 via the ASPIs 312. In one embodiment, all register values that affect the Slave channel scan unit 204 should be programmed identically to those of the Master channel scan unit 204 before enabling Master Scan-Assist mode.

Thus, the Master and Slave channel scan units 204 can work seamlessly and synchronously with each other because they are programmed to work in their respective modes, with proper parameters, and in sequence with each other. The Slave ASIC 77 is programmed through the Slave ASPI 312. In one embodiment, if the Master is to be programmed to operate in Scan-Assist Mode, for example, the Slave needs to be programmed to operate in Scan-Assist mode first so that the Slave is ready to receive commands from the Master unit 204. In one embodiment, the Slave channel scan unit 204 runs practically synchronously (source-synchronous) with the Master channel scan unit 204. Therefore, no handshaking is necessary between the Master and Slave ASICs 76 and 77, respectively. The Master ASIC 76 generates a command. This command is sent to the Slave ASIC 77 either through the ASPI 312 or a dedicated I/O pin 314 (e.g., on Start line) and is internally fed back to the Master ASIC 76. Therefore, both Master and Slave "see" the command in the same logical clock cycle, and perform the task required in synchronous manner.

In one embodiment, the Master channel scan logic unit 204 sends dynamic control signals (e.g., commands) to the Slave channel scan logic unit 204 to control operations such as: when to perform a scan, when to power down the analog channels, when to power up the analog channels, when to switch from one set of program parameters to another set of program parameters. The Master channel scan unit 204 sends its commands to the Slave channel scan in or through a START signal, as described above. In one embodiment, the Master channel scan unit 204 comprises one or more programmable state machines that determine which row is currently being scanned, at which frequency, and when the panel and the analog channels are ready for another timing sequence. The Master channel scan unit 204 further determines exactly when it should send a command to the Slave to start a timing sequence, and how many clock cycles it should wait before it starts its own timing sequence, so that Master and Slave timing sequences can be generated concurrently.

When both Master and Slave timing or scanning sequences are finished, as controlled by programmable register values, the Master channel scan logic 204 requests the Master ASPI 312 to retrieve result data from the Slave channel scan logic 204 through the Slave ASPI 312.

In one embodiment, the Master channel scan logic 204 also figures out when to switch from using one set of parameters to another set, sends a switching command to the Slave channel scan logic 204, and waits enough time for the Slave channel scan logic 204 to perform the parameter switch, before taking the next action. For example, in Dual frame mode, after finishing the scanning of a frame, the Master channel scan logic 204 asks the Slave channel scan logic 204 to switch from one set of scanning parameters (e.g., column to channel mappings, etc.) to another. As a result, different columns from the panel are mapped to analog channels, and different analog channels are enabled.

In one embodiment, the Master channel scan logic unit 204 also figures out when to power down all the analog channels and when to power them back up in some specific modes. For example, in frame-by-frame mode, after finishing scanning a frame, the Master channel scan unit 204 powers down all Master analog channels 202, and sends a command to the Slave channel scan logic 204 to power down all Slave analog channels 202. When the Master processor 208 instructs the Master channel scan unit 294 to power back up all analog channels, the Master channel scan unit 204 powers up all master analog channels 202, and sends a command to the Slave channel scan logic unit 204 to power up all Slave analog channels 202.

In one embodiment, Master-to-Slave commands are communicated through a START signal, and encoded as follows: (1) string of "010" is "START" (pulse is 1 bit-timed long): start a new timing sequence; (2) string of "0110" is "PWRD-WNALL" (pulse is 2 bit-timed long): power down all analog channels; (3) string of "01110" is "CLEAR": reset channel scan logic and power up all analog channels, and get ready to start new scan routine in both auto-scan mode and scan-assist mode; (4) string of "01110" is "TOGGLE": power up all analog channels (if in scan-assist frame-by-frame mode), and/or get ready to resume the scan routine (if in scan-assist dual-frame mode or in auto-scan dual-frame mode); (5) string of "01111" is "ABORT": abort the scan routine, reset channel scan logic. A more detailed description of these operating modes is provided in co-pending and commonly owned Patent application No. 11/650,201, entitled "Channel Scan Logic" filed concurrently herewith, the entirety of which is incorporated by reference herein.

In one embodiment, the Master and Slave ASPIs 312 communicate in accordance with a predetermined communication protocol, which may be a predetermined packet communication protocol similar to that implemented by the SPI 218, discussed above with respect to FIG. 6. In this embodiment, the Master and Slave ASPIs 312 can have a full set or a subset of the logic circuitry or modules (e.g., packet header decoder, micro-sequencer, etc.), which are similar or identical to the modules contained in SPI 218 for implementing a predetermined packet communication protocol.

In one embodiment, four types of packet commands are defined and recognized by the ASPI 312 packet protocol: NOP; Read Result Register File (RdRRF); Write Long Word (WrLW); Read Long Word (RdLW).

NOP—No operation: As discussed above, in full-duplex communication mode, this command is sent to "pull" a corresponding number of frames from the other device.

RdRRF—Read Result Register File: This command is sent from the Master to the Slave to read at least part of a Slave result register file (e.g., twelve 16-bit words) contained in Slave register block 210, for example. The Slave ASPI 312 resets an address pointer to the register file when it receives the command frame. In the following frames, it transmits (i.e., shifts) the contents of its register file to the Master ASIC 76 via the ASPI interfaces 312. The results data is then stored in a memory (e.g., memory 206) in the Master ASIC 76. In one embodiment, the Master ASPI 312 will transmit a plurality of frames (e.g., one command frame followed by twenty-four NOP frames) to pull a corresponding number of results data frames from the Slave register file 210. In one embodiment, once scan results data is stored from both halves 304a and 304b of the panel 302 for one complete raster scan of all rows, the master microprocessor 208 processes this "image" of one complete scan of the panel 302 to determine whether a touch or multi-touch event has occurred.

WrLW—Write Long Word: This command writes one or more 32-bit words to the slave register block 210. The Master ASPI 312 transmits the command packet containing a predetermined command frame, write address offset (with regards to the register block base address), and one or more 32-bit write data words. In one embodiment, the first data word is written to the address specified. Subsequent data words are written to word addresses that are incremented from the first address location. The Slave ASPI 312 returns the transaction status information after every write data word is received.

RdLW—Read Long Word: This command reads one or more 32-bit words from Slave register block 210 locations. The Master ASPI 312 transmits the command packet containing a predetermined command frame, read address offset (with regards to the register block 210 base address), and a desired number of 'NOP' frames corresponding to the number of frames or words to read. The Slave ASPI 312 transmits the read data to the Master ASPI 312 while at the same time the Master ASPI 312 is transmitting the NOP frames in full duplex mode.

Figure 8:
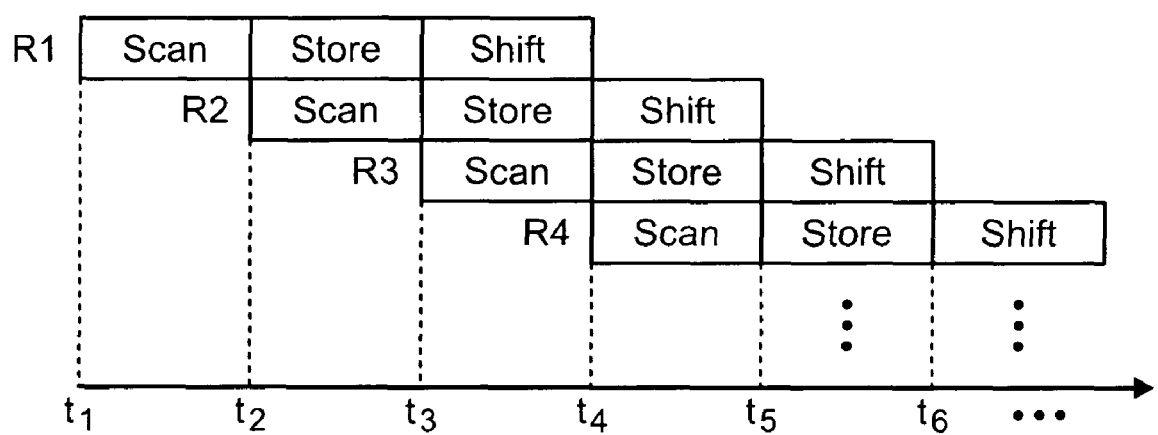
FIG. 8 is a timing diagram of pipelined operations performed by the Master and Slave controllers, in accordance with one embodiment of the present invention.

FIG. 8 illustrates a timing diagram illustrating pipeline operations performed by the Master and Slave ASICS 76 and 77, in accordance with one embodiment of the invention. In the Slave ASIC 77, much of the Auto-scan logic is disabled and the Slave runs off the Master clock received from a dedicated one of the plurality of I/O pins 314. The Slave 77 starts its scan logic timing sequence when it receives a START pulse from the Master 76 via a dedicated I/O line 314.

At time t1, the Master ASIC 76 provides a drive waveform to the first row electrode (R1) of the panel 302 (FIG. 7) and thereby scans R1.

At time t2, the following pipelined actions occur simultaneous or in an overlapping fashion (1) both the Master and Slave ADC channels 202 store R1 scan data from their respective panel halves 304a and 304b into respective Master and Slave results registers; and (2) the Master 76 scans the second row electrode (R2) of the panel 302.

At time t3, the following pipelined actions occur: (1) the Slave 77 shifts its R1 scan results data into a Master scan results register; (2) both the Master 76 and Slave 77 store R2 scan results into their respective scan registers; and (3) Master 76 scans row 3 (R3).

At time t4, the following pipelined actions occur: (1) the Slave 77 shifts its R2 scan results data into a Master scan results register; (2) both the Master 76 and Slave 77 store R3 scan results into their respective scan registers; and (3) Master 76 scans row 4 (R4). And so on, the pipeline operations can continue. By providing two or more controller ASIC's 76 and 77 in a Master/Slave configuration, which perform operations in a pipeline fashion, panel output signals can be processed in a very rapid and efficient manner. This results in increased response time to touch or multi-touch conditions by a computing device utilizing the touch surface system 300 as shown in FIG. 7.

It will be understood by those of ordinary skill in the art that the timing diagram of FIG. 8 does not necessarily illustrate the actual timing of parallel or pipelined operations that can be performed in various embodiments of the invention. Two parallel or pipelined operations do not necessarily have to start and/or stop at the same point in time but, rather, proceed in time in an overlapping manner. For example, a second operation does not have to wait for a first operation to be completed before the second operation begins. The two operations can proceed independently of one another in an overlapping manner.

In one embodiment, scan results data can be stored in as many as three different memory spaces within the Master and Slave ASICs 76 and 77, respectively. These memory spaces include a results register (not shown) in the ADC channels block 202, results register files (not shown) in the channel scan logic block 204, and a buffer space in the microprocessor memory 206. In one embodiment, the microprocessor memory 206 includes a data tightly coupled memory (DTCM). In both ASICs 76 and 77, the scanning logic and the data obtaining and shifting logic work substantially independently in a pipeline fashion.

In one embodiment, in the Slave ASIC 77, the slave scanning logic begins operating after receiving a command from the Master ASIC 76 and functions independently of storing and shifting results data to the Master 76. Results data is moved the Slave results register to the Slave result register file at the end of a timing sequence. The Slave results data is then moved from the Slave result register file to the Master result register file via the SPI's 312. Thereafter, both Master and Slave results data stored in the Master result register files are moved to the DTCM 206. The Slave DTCM buffer 206 is not designated to receives results data. The Master channel scan logic 204 controls the timing of these operations. It knows when the Slave has completed scanning since Slave scanning is synchronous with Master scanning. The Master channel scan logic 204 also knows when the SPI's 312 finish writing Slave data to the Master register files and when the SPI's 312 have completed data retrieval from the Slave register file. The Master channel scan logic 204 also determined when a new timing sequence can be started so that no Slave results are lost.

In the Master ASIC 76, logic is implemented to move data from the Master result registers in the ADC block 202 to Master result register files in the channel scan logic block 204 when there is new data in result registers and there is space in the result register files. In one embodiment, there are twelve result registers corresponding to twelve channels of the ADC block 202. Through appropriate commands and protocols via the SPI's 312, the Master ASIC 76 further requests Slave result data when there is new data in the Master result registers. Since the Master and Slave operate synchronously, Slave result data should be available at the same time that Master result data is available. The Master ASIC 76 then moves both Slave and Master results data from the Master result register files to the Master DTCM buffer 206 when both Master and Slave result data are available in the Master result register file. In embodiment the Master microprocessor 208 sets appropriate register flags and/or implements appropriate commands to give permission to the Master channel scan logic 204 to move the results data to the Master DTCM buffer 206.

In one embodiment, the scanning logic and the data moving logic described above operate substantially independently of each other and only communicate whether the Master result registers in the ADC block 202 are "full" or "empty." The moving of Slave result data for a particular timing sequence n (e.g., scan n) from the Slave result registers to the Master result register file occurs in parallel with the moving of Master result data for timing sequence n (scan n) from Master result registers to the Master result register file.

It will be understood by those of skill in the art that the timing and logic for performing scanning and data storing and shifting operations described above is exemplary only. Such functions and their timing may be implemented in a variety of different ways. The invention is not limited to any hard rule as to what data should be stored or shifted, or where such data needs to be moved or stored, when a certain row of the panel is being scanned, which can be programmed as desired depending on particular design and application considerations While various embodiments of the present invention have been described above, it should be understood that they have been presented by way of example only, and not of limitation. For example, although the disclosure is primarily directed at touch surface devices that utilize capacitive sensing, some or all of the features described herein may be applied to other sensing methodologies. Additionally, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application No. 11/649,998 entitled "Proximity and Multi-Touch Sensor Detection and Demodulation," filed concurrently herewith, the entirety of which is incorporated herein by reference. As used herein, "touch" events or conditions should be construed to encompass "hover" events and conditions and "touch surface panels" should be construed to encompass "proximity sensor panels." Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

What is claimed is:

1. A computer system, comprising:
   a sensor panel comprising a first portion and a second portion, wherein the first portion is configured to provide a first set of capacitive sense signals resulting from a scan of the first portion of the sensor panel and the second portion is configured to provide a second set of capacitive sense signals resulting from a scan of the second portion of the sensor panel;
   a first device configured to receive and the first set of capacitive sense signals provided by the first portion of the sensor panel and to generate a first set of scan results data based on the received first set of capacitive sense signals; and
   a second device configured to receive the second set of capacitive sense signals provided by the second portion of the sensor panel and to generate a second set of scan results data based on the received second set of capacitive sense signals,
   wherein the first and second devices are configured to operate together in a Master/Slave configuration to determine whether the generated first and second sets of scan results data indicate that a touch condition is present on the sensor panel, wherein the second device is configured to shift the generated second set of scan results data to the first device.

2. The computer system of claim 1 wherein the second device is configured to receive a timing signal from the first device and synchronize its operations to the timing signal.

3. The computer system of claim 2 wherein the first device includes a first clock generator and the second device includes a second clock generator that is disabled.

4. The computer system of claim 2 wherein the first device includes a first I/O pin and the second device includes a second I/O pin, and the first device and second device are configured to send the timing signal from the first I/O pin to the second I/O pin.

5. The computer system of claim 1 wherein a first microprocessor in the first device is configured to perform processing functions for both the first and second devices when a second microprocessor within the second device is disabled.

6. The computer system of claim 5 wherein the first device comprises a first communication interface and the second device comprises a second communication interface, wherein the first and second communication interfaces are configured to communicate in accordance with a predetermined communication protocol.

7. The computer system of claim 6 wherein the predetermined communication protocol comprises a packet-based communication protocol, enabling data to be transmitted between the first and second communication interfaces with no intervention by the first microprocessor.

8. The computer system of claim 6 wherein the first and second communication interfaces are serial peripheral interfaces.

9. The computer system of claim 1 comprising:
   a level shifter configured to amplify a drive signal received from the first device to a desired amplitude; and
   a decoder configured to apply the amplified drive signal to a selected drive electrode within the sensor panel.

10. The computer system of claim 1 wherein the sensor panel comprises a plurality of row electrodes separated by a dielectric from a plurality of column electrodes oriented substantially orthogonally from the row electrodes.

11. The computer system of claim 1 wherein the first device and second device are configured to perform operations in a pipeline fashion.

12. The computer system of claim 1 wherein the first and second devices are identical to one another and each is configurable to operate in a standalone, Master or Slave mode of operation.

13. The computer system of claim 1 wherein the system is embodied in a mobile telephone.

14. The computer system of claim 1 wherein the system is embodiment in a digital audio player.

15. The computer system of claim 1 wherein the first device is configured to determine whether the generated first and second sets of scan results data indicate that a touch condition is present on the sensor panel.

16. A method of processing capacitive sense signals from a sensor panel, comprising:
   providing a first set of capacitive sense signals by a first portion of the sensor panel to a first device, the first set of capacitive sense signals resulting from a scan of the first portion of the sensor panel;

providing a second set of capacitive sense signals by a second portion of the sensor panel to a second device, the second set of capacitive sense signals resulting from a scan of the second portion of the sensor panel;

generating by the first device a first set of scan results data based on the provided first set of capacitive sense signals;

generating by the second device a second set of scan results data based on the provided second set of capacitive sense signals; and operating the first and second devices together in a Master/Slave configuration to determine whether the generated first and second sets of scan results data indicate that a touch condition is present on the sensor panel, wherein the second device shifts the generated second set of scan results data to the first device.

17. The method of claim 16 comprising providing a timing signal from the first device to the second device, wherein the timing signal synchronizes operations of the first and second devices.

18. The method of claim 17 comprising disabling a clock generator in the second device, thereby reducing power consumption by the second device.

19. The method of claim 16 comprising:
providing the first and second sets of scan results data to a first microprocessor within the first device; and
disabling a second microprocessor within the second device, thereby reducing power consumption by the second device.

20. The method of claim 19 comprising communicating data between the first and second devices in accordance with a predetermined communication protocol.

21. The method of claim 20 wherein the predetermined communication protocol comprises a packet-based communication protocol, enabling data to be transmitted between the first and second devices with no intervention by the first microprocessor.

22. The method of claim 16 comprising:
amplifying a drive signal received from the first device to a desired amplitude; and
applying the amplified drive signal to a selected drive electrode within the sensor panel.

23. The method of claim 16 comprising:
applying first drive signals to drive electrodes of the sensor panel, causing the sensor panel to provide the first and second sets of capacitive sense signals;
storing the first set of scan results data in a first memory of the first device;
storing the second set of scan results data in a second memory of the second device;
shifting the second set of scan results data from the second memory to the first memory; and
applying second drive signals to the drive electrodes of the sensor panel, causing the sensor panel to provide third and fourth sets of capacitive sense signals from the sensor panel, wherein the applying, storing and shifting steps are performed in a pipeline fashion.

24. An apparatus for processing capacitive sense signals from a sensor panel, comprising:
means for providing a first set of capacitive sense signals by a first portion of the sensor panel to a first device, the first set of capacitive sense signals resulting from a scan of the first portion of the sensor panel;
means for providing a second set of capacitive sense signals by a second portion of the sensor panel to a second device, the second set of capacitive sense signals resulting from a scan of the second portion of the sensor panel;

means for generating by the first device a first set of scan results data based on the provided first set of capacitive sense signals;

means for generating by the second device a second set of scan results data based on the provided second set of capacitive sense signals; and means for operating the first and second devices together in a Master/Slave configuration to determine whether the generated first and second sets of scan results data indicate that a touch condition is present on the sensor panel, wherein the second device shifts the generated second set of scan results data to the first device.

25. The apparatus of claim 24 comprising means for providing a timing signal from the first device to the second device, wherein the timing signal synchronizes operations of the first and second device.

26. The apparatus of claim 25 comprising means for communicating data between the first and second devices in accordance with a predetermined communication protocol.

27. The apparatus of claim 26 wherein the predetermined communication protocol comprises a packet-based communication protocol, enabling data to be transmitted between the first and second devices with no intervention by first and second processors within the first and second devices, respectively.

28. The apparatus of claim 24 comprising:
means for amplifying a drive signal received from the first device to a desired amplitude; and
means for applying the amplified drive signal to a selected drive electrode within the sensor panel.

29. The apparatus of claim 24 comprising:
means for applying first drive signals to drive electrodes of the sensor panel, causing the sensor panel to provide the first and second sets of capacitive sense signals;
means storing the first set of scan results data in a first memory of the first device;
means for storing the second set of scan results data in a second memory of the second device;
means for shifting the second set of scan results data from the second memory to the first memory device; and
means for applying second drive signals to the drive electrodes of the sensor panel, causing the sensor panel to provide third and fourth sets of capacitive sense signals from the sensor panel, wherein the means for applying, storing and shifting are configured to cooperatively operate in a pipeline fashion.

30. A mobile telephone, comprising:
a sensor panel comprising a first portion and a second portion, wherein the first portion is configured to provide a first set of capacitive sense signals resulting from a scan of the first portion of the sensor panel and the second portion is configured to provide a second set of capacitive sense signals resulting from a scan of the second portion of the sensor panel;
a first device configured to receive the first set of capacitive sense signals provided by the first portion of the sensor panel and to generate a first set of scan results data based on the received first set of capacitive sense signals; and
a second device configured to receive the second set of capacitive sense signals provided by the second portion of the sensor panel and to generate a second set of scan results data based on the received second set of capacitive sense signals,
wherein the first and second devices are configured to operate together in a Master/Slave configuration to determine whether the generated first and second sets of scan results data indicate that a touch condition is present on the sensor panel, wherein the second device is configured to shift the generated second set of scan results data to the first device.

31. A digital audio player, comprising:
a sensor panel comprising a first portion and a second portion, wherein the first portion is configured to provide a first set of capacitive sense signals resulting from a scan of the first portion of the sensor panel and the second portion is configured to provide a second set of capacitive sense signals resulting from a scan of the second portion of the sensor panel;
a first device configured to receive the first set capacitive sense signals provided by the first portion of the sensor panel and to generate a first set of scan results data based on the received first set of capacitive sense signals; and
a second device configured to receive the second set of capacitive sense signals provided by the second portion of the sensor panel and to generate a second set of scan results data based on the received second set of capacitive sense signals,
wherein the first and second devices are configured to operate together in a Master/Slave configuration to determine whether the generated first and second sets of scan results data indicate that a touch condition is present on the sensor panel, wherein the second device is configured to shift the generated second set of scan results data to the first device.

* * * * *

UNITED STATES PATENT AND TRADEMARK OFFICE
CERTIFICATE OF CORRECTION

PATENT NO. : 7,848,825 B2
APPLICATION NO. : 11/650042
DATED : December 7, 2010
INVENTOR(S) : Thomas James Wilson et al.

It is certified that error appears in the above-identified patent and that said Letters Patent is hereby corrected as shown below:

In column 17, line 21, delete "transmit" and insert -- ready to transmit --, therefor.

In column 21, line 63, delete ""01110"" and insert -- ""011110"" --, therefor.

In column 21, line 67, delete "of"01111"" and insert -- "of "011111"" --, therefor.

In column 23, line 61, delete "receives" and insert -- receive --, therefor.

In column 24, line 40-41, delete "considerations" and insert -- considerations. --, therefor.

In column 25, line 58, in claim 1, delete "and the" and insert -- the --, therefor.

In column 26, line 57, in claim 14, delete "embodiment" and insert -- embodied --, therefor.

In column 28, line 35, in claim 29, delete "means" and insert -- means for --, therefor.

In column 28, line 40, in claim 29, delete "memory device;" and insert -- memory; --, therefor.

Signed and Sealed this
Eighteenth Day of October, 2011

David J. Kappos
*Director of the United States Patent and Trademark Office*